United States Patent [19]

Wang et al.

[11] Patent Number: 4,514,063
[45] Date of Patent: Apr. 30, 1985

[54] SCANNER DOCUMENT POSITIONING DEVICE

[75] Inventors: An Wang, Lincoln; Burton G. McConchie, Reading, both of Mass.

[73] Assignee: Wang Laboratories, Inc., Lowell, Mass.

[21] Appl. No.: 489,642

[22] Filed: Apr. 28, 1983

[51] Int. Cl.³ .............................................. G03B 21/00
[52] U.S. Cl. ..................................... 353/28; 353/121; 353/122; 353/101
[58] Field of Search ................... 353/28, 29, 102, 40, 353/41, 55, 120, 121, 122, 101; 33/180 R

[56] References Cited

U.S. PATENT DOCUMENTS

| | | | |
|---|---|---|---|
| 1,750,197 | 3/1930 | Schoen | 353/55 X |
| 1,916,567 | 7/1933 | Grant | 353/44 |
| 3,632,197 | 1/1972 | Shelton | 353/44 |
| 4,012,136 | 3/1977 | Croix | 353/102 |

Primary Examiner—Harry N. Haroian
Attorney, Agent, or Firm—Michael H. Shanahan; Joseph E. Funk

[57] ABSTRACT

Apparatus is disclosed which functions with a scanning arrangement including a charge coupled device (CCD) scanner and an analog-to-digital converter to digitize documents for storage, display and transmission to a remote location. The apparatus is attached to the scanner and consists of a reticle with a site pattern thereon, a lens arrangement and a lamp which are used to position a document for scanning. Prior to scanning the document the lamp is briefly energized to project the pattern onto an easel on which the document is placed, and the portion of the document on which the pattern is projected is the portion that will subsequently be scanned by the scanner.

19 Claims, 3 Drawing Figures

SCANNER DOCUMENT POSITIONING DEVICE

BACKGROUND OF THE INVENTION

This invention relates generally to a method and apparatus for facsimile systems and office information systems and more specifically to raster image scanner used to scan and digitize documents.

Office information systems include computers and associated peripherals such as monitors, eg a cathode ray tube (CRT), mass storage devices and printers to keep track of, to manipulate and to distribute information necessary to the activities of an office. Typically, these systems deal only with structured, digital data representing the information. Text and graphic information displayed on a monitor or printed out by a printer are created solely from structured data. In addition, document scanning devices are now being added to such office information systems such as described in U.S. patent application Ser. No. 440,668 filed Nov. 10, 1982, entitled Management Communication Terminal System and having a common inventor with this present patent application. This patent application is incorporated herein by reference.

As described in the patent application cited in the previous paragraph such office information systems now include a graphic data generator in the form of a camera for scanning a document to create a signal representing the information on the document, and the signal may be used to display the document on the video display associated with the scanning camera, or the signal may be stored for future use, or the signal may be transmitted to a remote location for displaying the document via a printer or a video terminal thereat.

Due to cost and other practical considerations these scanning cameras typically utilize a charge coupled device (CCD) linear array and optics and the CCD array and a document are moved relative to each other while each CCD device in the array is periodically and rapidly sampled using a time division multiplexing technique. Each of these samples is then digitized using an analog-to-digital converter to create a digital representation of the document being scanned.

There is one problem in prior art document scanning system utilizing CCD arrays. Using CCD arrays it typically takes several seconds to completely scan a document. Then the digitized information resulting from the scanning process is used to redisplay the document on the video display or a printer to verify that the desired portions of the document has been scanned. Normally this is not the case and the document must be repositioned and the scanning process repeated with the results again being checked. This process is often repeated several times in order to properly position a document under the scanning device to scan the desired portion of the document. This can take an inordinate amount of time which is unacceptable to a busy executive.

The Applicants' have solved this problem in the prior art by provided a method and apparatus for quickly and easily positioning a document only once and the desired portion of the document will be scanned and digitized the first scan.

SUMMARY OF THE INVENTION

In accordance with the teaching of our invention we provide a document positioning device which functions with a scanning camera to assure that a document may be quickly and easily positioned and the desired portion of the document will be scanned the first time. To achieve this result our novel apparatus is used to project a pattern on an easel in front of the scanning camera and on which a document to be scanned is placed. The projected pattern indicates the bounds of the area or site area that will subsequently be scanned by the camera. The operator positions a document with the projected pattern thereon to locate the portion of the document to be scanned within the projected boundary areas. Thereafter, the operator operates a control which extinguishes the projected pattern and causes the scanning camera to scan the document. The signals from the scanning process are in analog form and are applied to an analog-to-digital converter to digitize the information on the document. Our invention may be utilized with a scanning camera operating solely in a document facsimile transmission system on in conjunction with other office information equipment systems to implement a communication terminal.

DESCRIPTION OF THE DRAWING

Our invention will be better understood upon reading the following detailed description in conjunction with the drawing in which.

DETAILED DESCRIPTION

Figure 1:
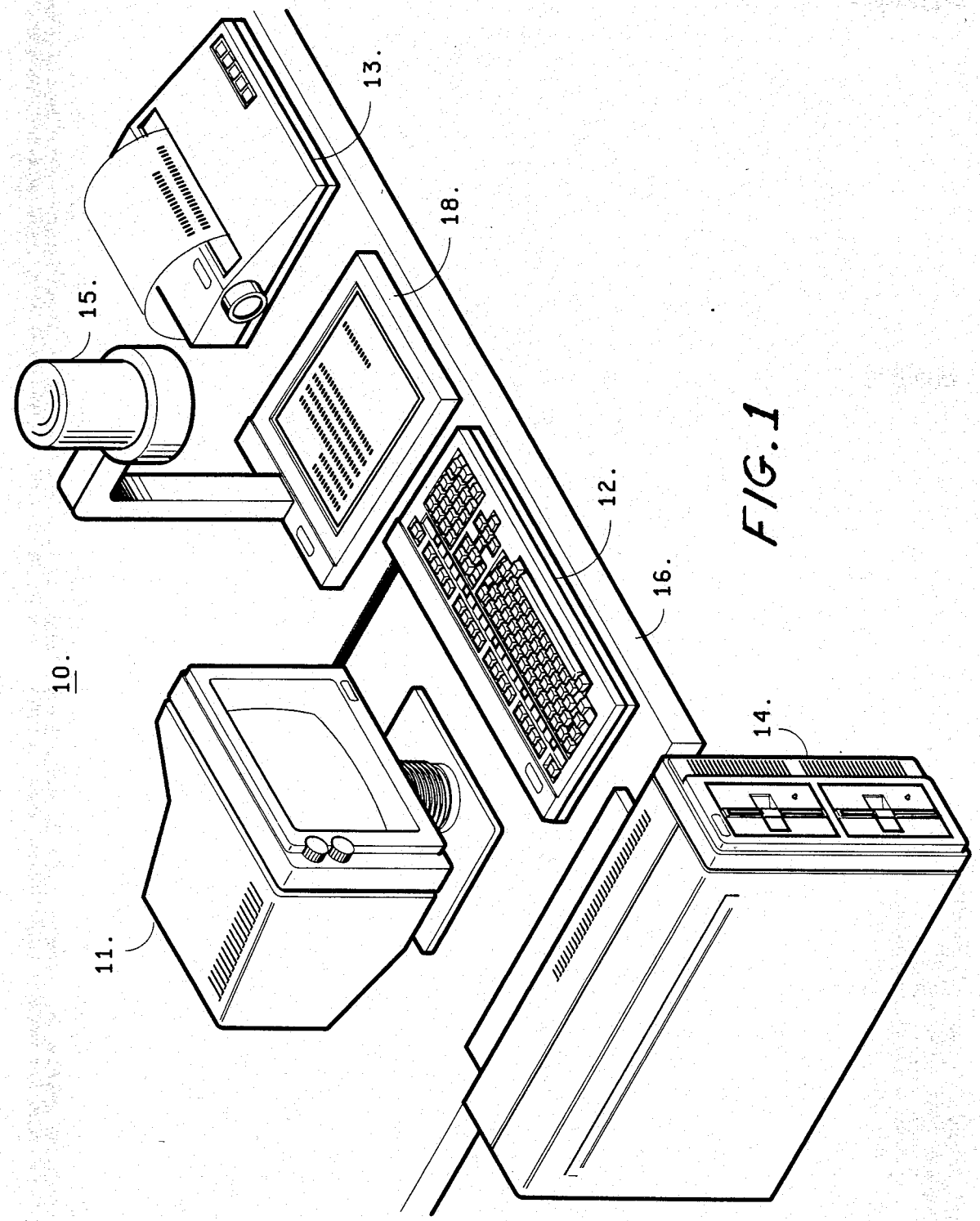
FIG. 1 is a pictorial representation of an office information system including a video display terminal with associated computer, a printer and a scanning camera for digitizing graphic and other documents in accordance with the teaching of our invention.

Apparatus 10 in FIG. 1 is an office information system operable as a communication terminal and includes a video terminal 11 with a keyboard 12, a printer 13, a console 14, and a CCD scanner/digitizer 15 which utilizes the present invention. All this equipment is supported on table top 16. The cabling interconnecting these equipment is not shown but should be understood to be present.

Video monitor 11, keyboard 12, printer 13 and console 14 are the standard parts of the computer, and scanner digitizer 15 is added to make the computer into a communication terminal. The interface circuitry, device controllers, memory and communication controller and other parts that make up the terminal are housed in console 14 along with the circuitry for the computer. Two such office information systems 10 and 10A functioning as communication terminals may be interconnected via a telecommunications link (not shown) to permit communications between the systems including the transmission of scanned and digitized documents. Documents such as document 17 on easel 18 of scanner digitizer 15 may have any combination of alphanumeric and graphic information to be scanned and digitized. In this manner scanner digitizer 15 also serves as a personal facsimile machine with a document 17 being scanned and digitized at one office information and system then transmitted via a telecommunications link to another office information system 10A to be reproduced at the printer 13 thereat. For this type of operation printer 13 most advantageously should be a dot matrix printer.

Figure 2:
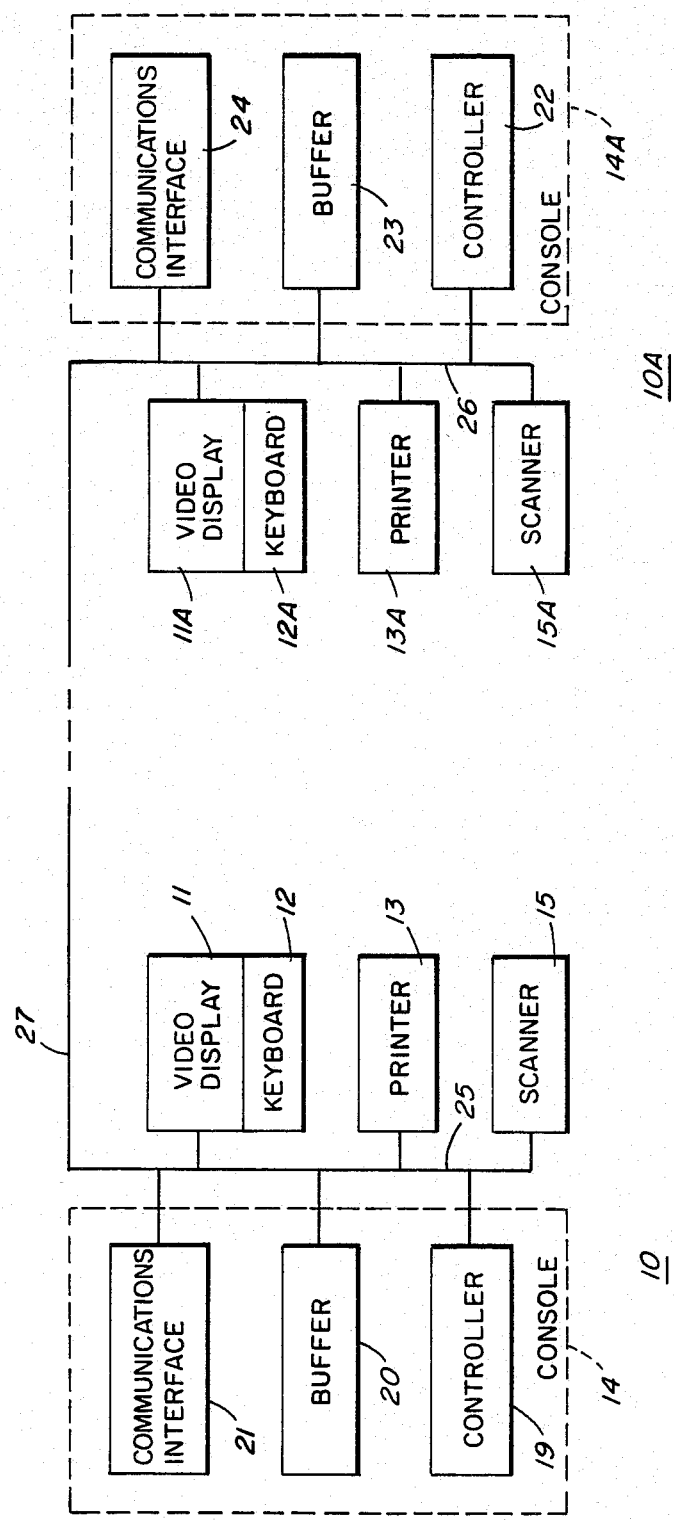
FIG. 2 is a block diagram of two office information systems interconnected to transmit signals therebetween.

In FIG. 2 as shown in the block diagram of two office information systems 10 and 10A interconnected by a telecommunications link 27. Each office information system 10 and 10A respectively, has a console 14 and 14A, video display 11 and 11A, keyboards 12 and 12A, printers 13 and 13A, and scanners 15 and 15A. Within each office information system all the components therein are interconnected by a bus, which is bus 25 for system 10 and bus 26 for system 10A. Within console 14 of office information system 10 is a controller 19 which is advantageously a microprocessor system, a buffer memory 20 and a communications interface 21 via which system 10 is connected to telecommunications link 27. Office information system 10A has similar elements 22, 23, and 24 within console 14A. Within office information system 10 a document that may have alphanumeric and/or graphic information thereon is digitized by scanner 15 and the resultant digital information is stored in buffer memory 20 of console 14. This digitized information then may be read out of buffer memory 20 by controller 19 and used to display the document on video display 11 or to print the document out on printer 13. In addition, the digitized information representing the document may be also passed via communications interface 21 under the control of controller 19 and via telecommunications link 27 to office information system 10A to be stored in buffer memory 23 thereat. Controller 22 may then read the digitized information out of buffer memory 23 to reproduce the document on video display 11A or to reproduce a hard copy via printer 13A. Similarly, a document digitized at office information system 10A may be transmitted to system 10 to be reproduced thereat. It is in this setting that our novel scanner document positioning device is utilized with each of scanners 13 and 13A, in systems 10 and 10A respectively, to facilitate the scanning and transmission of documents.

When a CCD document scanner is used solely in a facsimile system each physical location will have a scanner 15 to scan documents, a printer 13 to reproduce documents and a communications interface 21 to interface elements 13 and 15 to a communications link to transmit signals to and receive signals from a remote facsimile system that may or may not be made up of the same combination of equipment.

Figure 3:
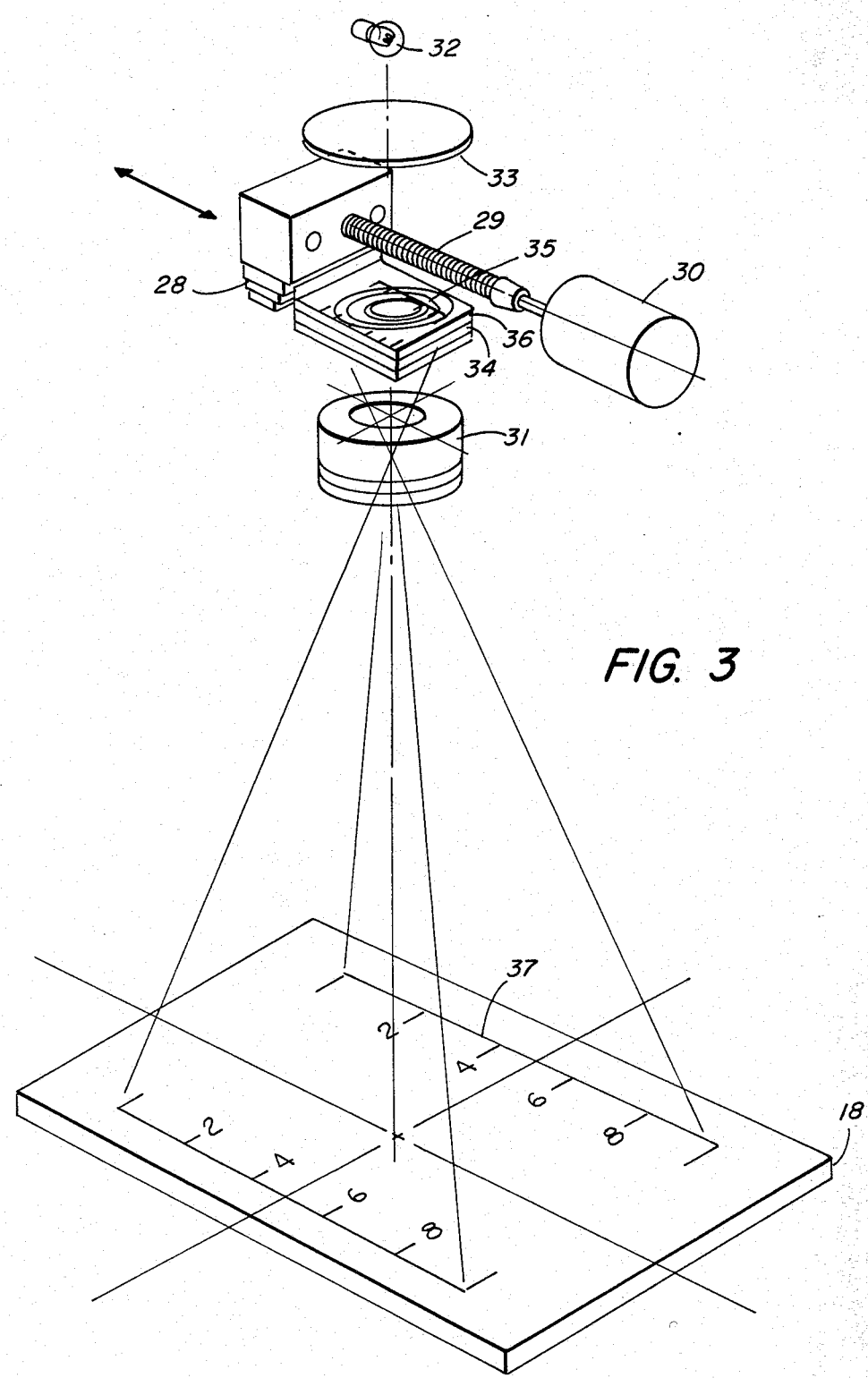
FIG. 3 shows our novel document positioning device coupled with a CCD scanning camera.

In FIG. 3 is shown a few of the elements within scanners 15 and 15A and including those elements making up the document positioning device in accordance with the teaching of our invention. As is known, a document (not shown) is placed upon easel 18 for scanning and digitizing. The document is illuminated by a light source (not shown) made up of two 150 watt projection lamps and the light reflected from the illuminated document is received by lens 31 which focuses it upon a plane across which CCD array 28 will be moved to scan the document in a manner well known in the art. During the scanning process motor 30 is energized to turn lead screw 29 along which a carrier upon which CCD array 28 is mounted is moved. Thus, the CCD array 28 is moved in the direction of lead screw 29. As previously mentioned, individual elements of CCD array 28 are sampled in a time division multiplexing operation and the outputs are digitized by an analog-to-digital converter (not shown) in a manner well known in the art to digitize the document. In a manner well known in the art the housing in which all these elements are mounted may be moved vertically to be closer to or further away from a document on easel 18. As the head is moved closer to easel 18 image 37 is smaller and the area to be scanned will be smaller. However, in a manner well known in the art, after the scanner head is vertically moved lens 31 must be adjusted to focus the document on easel 18 to be scanned. Image 37 projected onto easel 18 in accordance with the teaching of our invention facilitates this focusing. Since reticle 34 on which is located the image lies in the image plane across which the CCD scanner 28 passes, when image 37 is sharp and clear lens 31 is properly adjusted. In this manner the operator of the scanner may change the size of the area to be scanned and thereby achieve a closeup type operation and may quickly and easily achieve focus using lens 31.

The head may be moved vertically such that the distance between the reticle (image plane) and the easel is between 9 inches and 17.3 inches. When set at 9 inches, the closest to the easel, a 4.25 inch by 5.5 inch area is scanned. When set at 17.3 inches, the furthest from the easel, an 11 inch by 14 inch area is scanned. Vertical settings in between the limits will scan areas between the areas given immediately above.

Our novel document positioning apparatus comprises a lamp 32, heat absorbing glass 33, a light distributing lens made up of two fresnel lens 35 and 36, and sandwiched thereto is a reticle 34 upon which is a small representation of the image 37 shown on easel 18. Elements 34, 35, and 36 are attached to the CCD array 28 carrier and lie in the aforementioned image plane. Alternatively lenses 35 and 36 can be replaced by a 70 millimeter condenser lens made up of a pair of plane convex lenses as is known in the art. In operation the operator of the scanner places a document (not shown) upon easel 18 and then operates a control on the scanner to energize lamp 32. Lamp 32 will remain energized for a fixed period of time such as ten seconds at the end of which it will automatically be extinguished. However, if the operator of the scanner operates another control to place the scanner in the scan mode lamp 32 is also extinguished, even though the aribitrary period such as ten seconds has not expired, and the document upon easel 18 is then scanned in the manner well known in the art. Glass 33 is a transparent heat absorbing which protects reticle 34 and lenses 35 and 36 from the heat generated by 150 watt projection lamp 32 in order to project image 37 onto easel 18 under normal room lighting conditions. Glass 33 is approximately equivalent to KCl glass and may be obtained from many sources including Schott Optical Glass Inc., 400 York Avenue, Duryea, Pa.

Convective cooling is utilized. Lenses 35 and 36 cooperate to evenly distribute light generated by illumination means 32 upon reticle 34 to insure an evenly illuminated image 37 on easel 18 and to provide maximum throughput of light to enhance the projected image. Light 32 being energized causes light to pass through glass 33, reticle 34 and lenses 35 and 36 and then through lens 31 to project the image of reticle 34 onto easel 18 as shown by image 37 thereon. Image 37 defines the area on easel 18 that will be scanned by CCD scanner 28 when the scanning process is commenced. Reticle 34 is a thin sheet of stainless steel having the image etched therethrough. The operator of the scanner has two adjustments they can make. First, they may move the head of the scanner including the elements shown in FIG. 3 vertically to be closer to or further away from easel 18 as previously described. Secondly, image 37 on easel 18 can be seen to have several numbers thereon along the right and left hand edges.

When the operator wishes to scan and digitize only a portion of a document, he does so with a front panel control on the scanner which indicates 20%, 40%, 60%, 80%, or 100% of normal scan or anywhere in between. This controls the operation of motor 30 to limit how far along screw 29 CCD array 28 is moved during the scanning action. Thus, only a predetermined portion of the area covered by the projected image will be scanned.

While what has been described in above is the preferred embodiment of our invention, it will be obvious to those skilled in the art that numerous changes may be made without departing from the spirit and scope of the invention.

What we claim is:

1. A document positioning device used to locate a document so that desired material thereon may be scanned without further repositioning of the document, said document positioning device comprising:
   means for scanning said document, and
   means for projecting an image onto said document, said projected image defining the area on said document that will subsequently be scanned by said scanner and the portion of said document that is desired to be scanned is placed in said area.

2. The invention in accordance with claim 1 wherein said means for projecting an image comprises:
   a planar element having an image thereon, and
   illumination means energized to illuminate said planar element prior to scanning said document to thereby project said image onto said document, said projected image defining the area on said document that will subsequently be scanned by said scanner.

3. The invention in accordance with claim 2 further comprising means adjacent to said planar element and used for distributing light from said illumination means evenly over said planar element to provide a uniform projection of said image on said document.

4. The invention in accordance with claim 3 wherein said light distributing mean comprises:
   a first fresnel lens adjacent to said planar element and
   a second fresnel lens adjacent to said first fresnel lenses, wherein both said fresnel lens cooperate to distribute the light from said illumination means evenly over said planar element.

5. The invention in accordance with claim 4 further comprising a transparent heat absorbing member between said illumination means and both said lenses to allow illumination of said planar element while protecting said planar element and both said lenses from heat generated by said illuminating means.

6. The invention in accordance with claim 2 wherein said planar element is opaque and has said image cut therethrough.

7. Scanning and digitizing equipment wherein light reflected off a document is focused by a lens onto an image plane across which a scanning device is moved to thereby scan the document and generate an analog signal which is digitized to create a binary representation of the document, said scanning and digitizing equipment comprising:
   means for scanning said document,
   a planar element having an image thereon, said element lying in said image plane whereat said document is focused but before scanning begins, and
   illumination means located on the side of said planar element opposite said document and being energized to illuminate said planar element prior to scanning said document to thereby project the image on said planar element onto said document, said projected image defining the area on said document that will subsequently be scanned by the scanner.

8. The invention in accordance with claim 7 further comprising means adjacent to said planar element on the side thereof closest to said illumination means and used for distributing light from said illumination means evenly over said planar element.

9. The invention in accordance with claim 8 wherein said light distributing mean comprises:
   a first fresnel lens adjacent to said planar element and
   a second fresnel lens adjacent to said first fresnel lenses, wherein both said fresnel lenses cooperate to distribute the light from said illumination means evenly over said planar element.

10. The invention in accordance with claim 9 further comprising a transparent heat absorbing member between said illumination means and both said fresnel lenses to allow illumination of said planar element while protecting said planar element and both said lenses from heat generated by said illuminating means.

11. The invention in accordance with claim 7 wherein said planar element is opaque and has said image cut therethrough.

12. A method for locating a document to be scanned and digitized by a scanner so that only desired material on said document will be digitized, and comprising the steps of:
   projecting an image onto said document, said image defining the area on said document that will subsequently be scanned, and said document is positioned so that said desired material is within the area identified by said image,
   terminating said image projection,
   scanning said document, and
   digitizing said document.

13. The method in accordance with claim 12 wherein a transparent planar element having said image thereon and illumination means are used to project said image onto said document, and further comprising the step of moving said planar element out of the way so as not to interfere with said scanner as it scans said document.

14. In an office information system a document positioning and scanning device used to locate a document so that desired material thereon may be scanned and digitized, said document positioning and scanning device comprising:
   means for scanning said document, and
   means for projecting an image onto said document, said projected image defining the area on said document that will subsequently be scanned by said scanner and the portion of said document that is to be scanned is placed in said area.

15. The invention in accordance with claim 14 wherein said means for projecting an image comprises:
   a planar element having an image thereon, and
   illumination means energized to illuminate said planar element prior to scanning said document to thereby project said image onto said document, said projected image defining the area on said document that will subsequently be scanned by said scanner.

16. The invention in accordance with claim 15 further comprising means adjacent to said transparent planar element and used for distributing light from said illumination means evenly over said planar element to provide a uniform projection of said image on said document.

17. The invention in accordance with claim 16 wherein said light distributing mean comprises:

a first fresnel lens adjacent to said planar element and a second fresnel lens adjacent to said first fresnel condenser lenses, wherein both said fresnel lens cooperate to distribute the light from said illumination means evenly over said planar element.

18. The invention in accordance with claim 17 further comprising a transparent heat absorbing member between said illumination means and both said lenses to allow illumination of said planar element while protecting said planar element and both said lenses from heat generated by said illuminating means.

19. The invention in accordance with claim 14 wherein said planar element is opaque and has said image cut therethrough.

* * * * *